United States Patent
Kameda et al.

(10) Patent No.: US 7,821,745 B2
(45) Date of Patent: Oct. 26, 2010

(54) THIN-FILM MAGNETIC HEAD IN WHICH PERPENDICULAR MAGNETIC RECORD HEAD OVERLAPS ON REPRODUCING HEAD

(75) Inventors: Hiroshi Kameda, Niigata-ken (JP); Yusuke Touma, Niigata-ken (JP)

(73) Assignee: TDK Corporation, Tokyo (JP)

( * ) Notice: Subject to any disclaimer, the term of this patent is extended or adjusted under 35 U.S.C. 154(b) by 918 days.

(21) Appl. No.: 11/676,709

(22) Filed: Feb. 20, 2007

(65) Prior Publication Data

US 2007/0195453 A1      Aug. 23, 2007

(30) Foreign Application Priority Data

Feb. 20, 2006  (JP)  ............... 2006-042271

(51) Int. Cl.
G11B 5/187  (2006.01)
G11B 5/39   (2006.01)

(52) U.S. Cl. .............. 360/317; 360/319; 360/125.16; 360/125.2

(58) Field of Classification Search .............. 360/317, 360/125.03, 125.16, 125.3, 125.2, 319
See application file for complete search history.

(56) References Cited

U.S. PATENT DOCUMENTS

| 2002/0036871 | A1 | 3/2002 | Yano et al. |
| 2003/0223149 | A1 | 12/2003 | Kimura et al. |
| 2005/0141142 | A1 | 6/2005 | Mochizuki et al. |
| 2006/0082924 | A1* | 4/2006 | Etoh et al. ............... 360/125 |
| 2006/0132972 | A1* | 6/2006 | Tagami et al. ............ 360/126 |
| 2006/0203381 | A1* | 9/2006 | Okada et al. ............ 360/125 |

FOREIGN PATENT DOCUMENTS

| JP | 2004-005826 | 1/2004 |
| JP | 2005-18851 | 1/2005 |
| JP | 2002-100006 | 4/2005 |
| JP | 2002-190515 | 7/2005 |
| JP | 2006-99891 | 4/2006 |
| JP | 2006-18558 | 7/2006 |

* cited by examiner

*Primary Examiner*—Jefferson Evans
(74) *Attorney, Agent, or Firm*—Brinks Hofer Gilson & Lione

(57) ABSTRACT

A thin-film magnetic head is provided. The thin-film magnetic head includes a return-yoke layer formed on an opposed surface such that a maximum length of the return-yoke layer is shorter than a longer length of the length of the upper shield layer and the lower shield layer. The length sets in the range of 0 to 2 μm, and more preferably 2 μm. Accordingly, magnitudes of leakage magnetic fields leaked from each front end surface of return-yoke layer, the upper shield layer, and the lower shield layer toward the record medium are balanced and reduced. An advantage of the invention is to provide a thin-film magnetic head so as to prevent a record data recorded in a record medium from being erased.

7 Claims, 9 Drawing Sheets

RETURN-YOKE: WIDTH OF 60μm × LENGTH OF 22μm × THICKNESS OF 1.6μm,
UPPER SHIELD: WIDTH OF 60μm × LENGTH OF 22μm × THICKNESS OF 1.2μm,
LOWER SHIELD: WIDTH OF 60μm × LENGTH OF Xμm × THICKNESS OF 1.2μm,
DISTANCE BETWEEN UPPER SHIELD AND RETURN-YOKE: 4.0μm.

| MEARSURING LOCATION | 10 | 22 | 40 | 70 |
|---|---|---|---|---|
| RY | 1.85 | 1.75 | 1.18 | 1.23 |
| UPPER SHIELD | 1.46 | 1.52 | 2.84 | 3.28 |
| LOWER SHIELD | 1.33 | 1.56 | 2.83 | 3.25 |

RETURN-YOKE: WIDTH OF 60μm × LENGTH OF 22μm × THICKNESS OF 1.6μm,
UPPER SHIELD: WIDTH OF 60μm × LENGTH OF Xμm × THICKNESS OF 1.2μm,
LOWER SHIELD: WIDTH OF 60μm × LENGTH OF 22μm × THICKNESS OF 1.2μm,
DISTANCE BETWEEN UPPER SHIELD AND RETURN-YOKE: 4.0μm.

| MEARSURING LOCATION | 10 | 15 | 19 | 22 | 25 | 30 | 40 | 70 |
|---|---|---|---|---|---|---|---|---|
| RY | 1.88 | 1.84 | 1.81 | 1.75 | 1.60 | 1.40 | 0.87 | 0.93 |
| UPPER SHIELD | 1.30 | 1.39 | 1.45 | 1.52 | 1.76 | 2.18 | 2.89 | 3.32 |
| LOWER SHIELD | 1.52 | 1.50 | 1.51 | 1.56 | 1.76 | 2.14 | 2.77 | 3.19 |

RETURN-YOKE: WIDTH OF 60μm × LENGTH OF Xμm × THICKNESS OF 1.6μm,
UPPER SHIELD: WIDTH OF 60μm × LENGTH OF 22μm × THICKNESS OF 1.2μm,
LOWER SHIELD: WIDTH OF 60μm × LENGTH OF 22μm × THICKNESS OF 1.2μm,
DISTANCE BETWEEN UPPER SHIELD AND RETURN-YOKE: 4.0μm.

| MEARSURING LOCATION | 10 | 15 | 19 | 22 | 25 | 30 | 40 | 70 |
|---|---|---|---|---|---|---|---|---|
| RY | 0.60 | 1.01 | 1.41 | 1.75 | 2.10 | 2.67 | 3.61 | 4.54 |
| UPPER SHIELD | 2.09 | 1.87 | 1.67 | 1.52 | 1.39 | 1.22 | 1.05 | 1.10 |
| LOWER SHIELD | 2.04 | 1.86 | 1.69 | 1.56 | 1.45 | 1.31 | 1.18 | 1.27 |

RETURN-YOKE:WIDTH OF 60μm × LENGTH OF Xμm × THICKNESS OF 1.6μm,
UPPER SHIELD: WIDTH OF 60μm × LENGTH OF 40μm × THICKNESS OF 1.2μm,
LOWER SHIELD: WIDTH OF 60μm × LENGTH OF 40μm × THICKNESS OF 1.2μm,
DISTANCE BETWEEN UPPER SHIELD AND RETURN-YOKE:4.0μm.

| MEARSURING LOCATION | 10 | 22 | 33 | 37 | 40 | 43 | 48 | 60 | 70 |
|---|---|---|---|---|---|---|---|---|---|
| RY | 0.46 | 1.13 | 1.92 | 2.25 | 2.52 | 2.79 | 3.20 | 3.88 | 4.03 |
| UPPER SHIELD | 3.33 | 3.06 | 2.62 | 2.46 | 2.34 | 2.23 | 2.12 | 2.06 | 2.14 |
| LOWER SHIELD | 3.24 | 2.98 | 2.60 | 2.45 | 2.35 | 2.27 | 2.18 | 2.16 | 2.23 |

THIN-FILM MAGNETIC HEAD IN WHICH PERPENDICULAR MAGNETIC RECORD HEAD OVERLAPS ON REPRODUCING HEAD

This application claims the benefit of Japanese Patent Application No. 2006-042271 filed Feb. 20, 2006, which is hereby incorporated by reference.

TECHNICAL FIELD

The present embodiments relate to a thin-film magnetic head in which a perpendicular-magnetic recording head overlaps on a reproducing head.

BACKGROUND

The thin-film magnetic head of a perpendicular magnetic recording method has a configuration which inputs a recording signal by perpendicularly magnetizing a hard film of a record medium. The thin-film magnetic head of a perpendicular magnetic recording method may narrow a required width to magnetize and transit so as to improve a recording density more than a thin-film magnetic head of a longitudinal magnetic recording method.

JP-A-2002-100006 discloses a record-reproducing complex-type thin-film magnetic head, a recording portion, and reproducing portion are overlapped in a film thickness direction. The thin-film magnetic head has a supplementary magnetic pole (return-yoke layer) that is disposed more rear from a medium opposed surface than a major magnetic pole, an upper shield, and a lower shield so as to prevent a magnetic field of the supplementary magnetic pole from being expanded and prevent an information stored in a record medium from being erased due to the magnetic field generated in the supplementary magnetic pole and the upper shield (see [0022] or [0025] of JP-A-2002-100006).

A magnetic record reproducing device disclosed in JP-A-2005-190515 (US2005141142A1) is formed shorter than a back contact that bonds an upper shield and a lower shield to a major magnetic pole and a supplementary magnetic pole (return-yoke layer) so as to suppress a magnetic flux flowing in the upper shield and the lower shield and lower a magnetic field applied to a reproducing element formed between the upper shield and the lower shield. In such a configuration, it is difficult for the reproducing element to be degraded or destroyed.

JP-A-2004-005826 improves an overwrite quality. In FIG. 1 of the JP-A-2004-005826, the cross-sectional view of a thin-film magnetic head is illustrated, but gaps of a height direction of the upper shield, the lower shield, a supplementary magnetic pole (return-yoke layer), and the like are not described.

Except for the case described above, when a floating magnetic field (disturbance-magnetic field) is absorbed by the upper shield layer, the lower shield layer, and the return-yoke layer, magnitudes of leakage magnetic fields leaked from each front end surface the upper shield layer, the lower shield layer, and the return-yoke layer toward a record medium increases. Accordingly, the erasing and the like due to the record data recorded in the record medium may be properly prevented.

It is preferable that the magnitudes of the leakage magnetic field leaked from each front end surface of the upper shield layer, the lower shield layer, and the return-yoke layer are as balanced and reduced as possible. For example, the magnitude of the leakage magnetic field leaked from the upper shield layer or the lower shield layer may be reduced so as not to affect the magnetic data. When the magnitude of the leakage magnetic field leaked from the return-yoke layer is large, the erasing cannot be solved. Accordingly, the magnitudes of the leakage magnetic fields of three magnetic layers are necessary to be as small as possible.

Conventionally, studies have not been conducted as to the magnitudes of the leakage magnetic fields leaked from each front end surface of the upper shield layer, the lower shield layer, and the return-yoke layer being as regular and small as possible. According to experiments, when lengths of the height direction of the upper shield layer, the lower shield layer, and the return-yoke layer are all equal and back end surfaces of each layer are formed on a location equal to the film thickness direction, the magnitudes of the leakage magnetic field leaked from the upper shield layer, the lower shield layer, and the return-yoke layer become unbalanced, in particular, the magnitude of the leakage magnetic field leaked from the return-yoke becomes large, and the record data in the return-yoke layer is easily erased.

In at least FIGS. 2 and 15 of JP-A-2005-190515 the and FIG. 1 of JP-A-2004-005826, the length of the upper shield layer, the lower shield layer, the return-yoke layer are not equal. In JP-A-2005-190515 and JP-A-2004-005826, specific lengths of the return-yoke layer, the upper shield layer, and the lower shield layer are not described and a length difference between the return-yoke layer and the upper shield layer is not obvious.

SUMMARY

The present embodiments may obviate one or more of the drawbacks and limitations of the related. For example, in one embodiment, by adjusting a length difference of the height direction of the return-yoke layer, the upper shield layer, and the lower shield layer, the magnitudes of the leakage magnetic fields leaked from the return-yoke layer, the upper shield layer, and the lower shield layer each may become balanced and reduced. A thin-film magnetic head to prevent record data recorded in a record medium from being erased may be provided.

A thin-film magnetic head has a perpendicular magnetic recording head formed on a reproducing head so as to overlap therewith. The reproducing head has an upper shield layer and a lower shield layer opposed to each other in the film thickness direction and a reproducing element formed between the upper shield layer and the lower shield layer. The reproducing head has a first magnetic layer including a major magnetic pole exposed from the opposed surface by a track width TW. A return-yoke layer is disposed opposite to the first magnetic layer with a gap layer interposed therebetween on the opposed surface. A coil layer generates a recording magnetic field provided between the first magnetic layer and the return-yoke layer.

A gap in the thickness direction between the return-yoke layer and the upper shield layer is longer than that between the upper shield layer and the lower shield layer. A gap in the thickness direction between the return-yoke layer and the upper shield layer is longer than that between the upper shield layer and the lower shield layer. A maximum gap in the height direction from the opposed surface of the return-yoke layer is shorter than a longer maximum gap in the height direction from the opposed surface of the upper shield layer and the lower shield layer from the opposed surface by a predetermined length such that the return-yoke layer is formed toward the opposed surface. The predetermined gap is in the range of about 0 to 2 μm.

Since a gap in the thickness direction between the return-yoke and the return-yoke shield is longer than that between the upper shield layer and the lower shield layer, a magnetostatic coupling worked between the return-yoke layer and the upper shield layer is smaller than that worked between upper shield layer and the lower shield layer. Accordingly, even when the gaps of the upper shield layer and the lower shield layer in the height direction are rather different, and thus one of the upper shield layer and the lower shield layer absorbs the floating magnetic field more, a magnetization states of the upper shield layer and the lower shield layer are almost equal and the magnitude of the leakage magnetic field leaked from the front end surface of the upper shield layer and the lower shield layer are almost equal.

According to an experiment described below, the gaps of the lower shield layer, the upper shield layer, and the return-yoke layer are all equal, the magnitude of the leakage magnetic field leaked from the front end surface of the return-yoke due to the magnetostatic coupling magnitude is stronger than the magnitudes of the leakage magnetic fields leaked from the front end surfaces of the lower shield layer and the upper shield layer. Additionally, when the length of the return-yoke layer is too short, the floating magnetic field is easily absorbed by the upper shield layer and the lower shield layer. Accordingly, the magnitudes of the leakage magnetic fields leaked from the front end surfaces of the lower shield layer and the upper shield layer become large.

A maximum length from the opposed surface of the return-yoke in the height direction is shorter, by a predetermined length, than the longer length of the maximum length of the upper shield layer and the lower shield layer from the opposed surface in the height direction such that the return-yoke layer is formed toward the opposed surface. The predetermined length is in the range of about 0 to 2 µm.

The leakage magnetic fields leaked from each front end surface of the upper shield layer and the lower shield layer toward a record medium each are small or equal, and the erasing and the like due to the leakage magnetic field of the record data recorded in the record medium may be properly prevented.

In one embodiment, the predetermined length is preferably 2 µm. In an experiment described below, due to the predetermined length, the magnitudes of the leakage magnetic fields leaked from each front end surface of the return-yoke layer, the upper shield layer, and the lower shield layer toward the record medium become equal so as to be small.

In one embodiment, maximum lengths of the upper shield layer and the lower shield layer are preferably in the range of about 0.9 to 1.1 µm. The maximum lengths of the upper shield layer and the lower shield layer are more preferably equal. The strong magnetostatic coupling is worked between the upper shield layer and the lower shield. A ratio of the maximum length is out of the above range, it is not preferable since a difference of the magnitude of the leakage magnetic field leaked from each front surface of the lower shield layer and that of the leakage magnetic field leaked from front end surface of the upper shield layer becomes easily large. Accordingly, by forming the upper shield layer and the lower shield layer by the above ratio, the magnitudes of the leakage magnetic fields leaked from the front end surfaces of the upper shield layer and the lower shield layer may become almost equal.

In one embodiment, a whole back end surface of the return-yoke layer is preferably formed toward the opposed surface longer by a predetermined length than a back end surface, which is extended in the height direction, in the upper shield layer and the lower shield layer, and more preferably each back end surface of the upper shield layer and the lower shield layer has an equal shape or a similar shape. In this embodiment, the leakage magnetic fields leaked from each front end surfaces of the upper shield layer and the lower shield layer toward a record medium each are more effectively small or equal, and the erasing and the like due to the leakage magnetic field of the record data recorded in the record medium may be properly prevented.

In one embodiment, when an inclined plane of each back end surface becomes smaller from the back end portion of the side end surface located in both sides of the track width direction toward the height direction, a magnitude of a magnetic domain formed near both end surfaces of the track width direction of the return-yoke layer, the upper shield layer, and the lower shield layer and going in a direction parallel to the height direction may become small, and the magnitude of the leakage magnetic field leaked from each front end surfaces of the return-yoke layer, the upper shield layer, and the lower shield layer may properly become small.

Since the leakage magnetic field leaked from each front end surface of the return-yoke, the upper shield layer, and the lower shield layer toward the record medium each may become small or approach the same magnitude, the erasing and the like due to the leakage magnetic field of the record data recorded in the record medium may be properly prevented.

DETAILED DESCRIPTION

Figure 1:
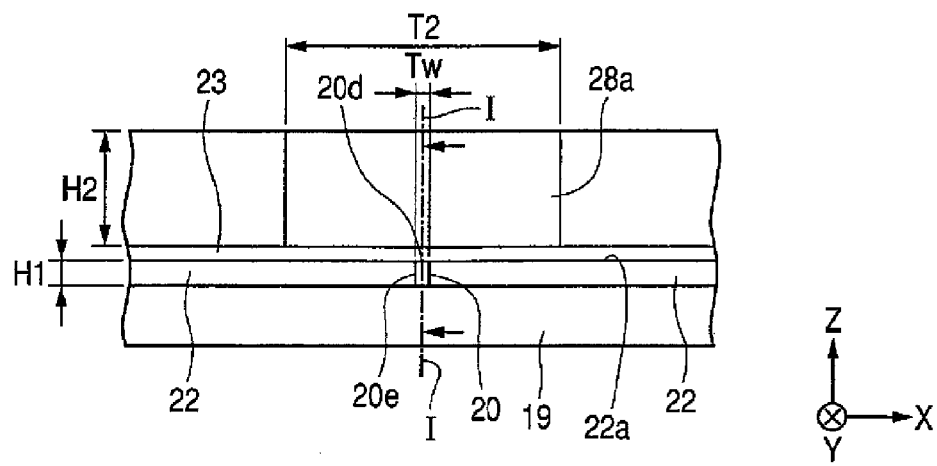
FIG. 1 is a front elevation view of a perpendicular magnetic recording head according to one embodiment.
Figure 2:
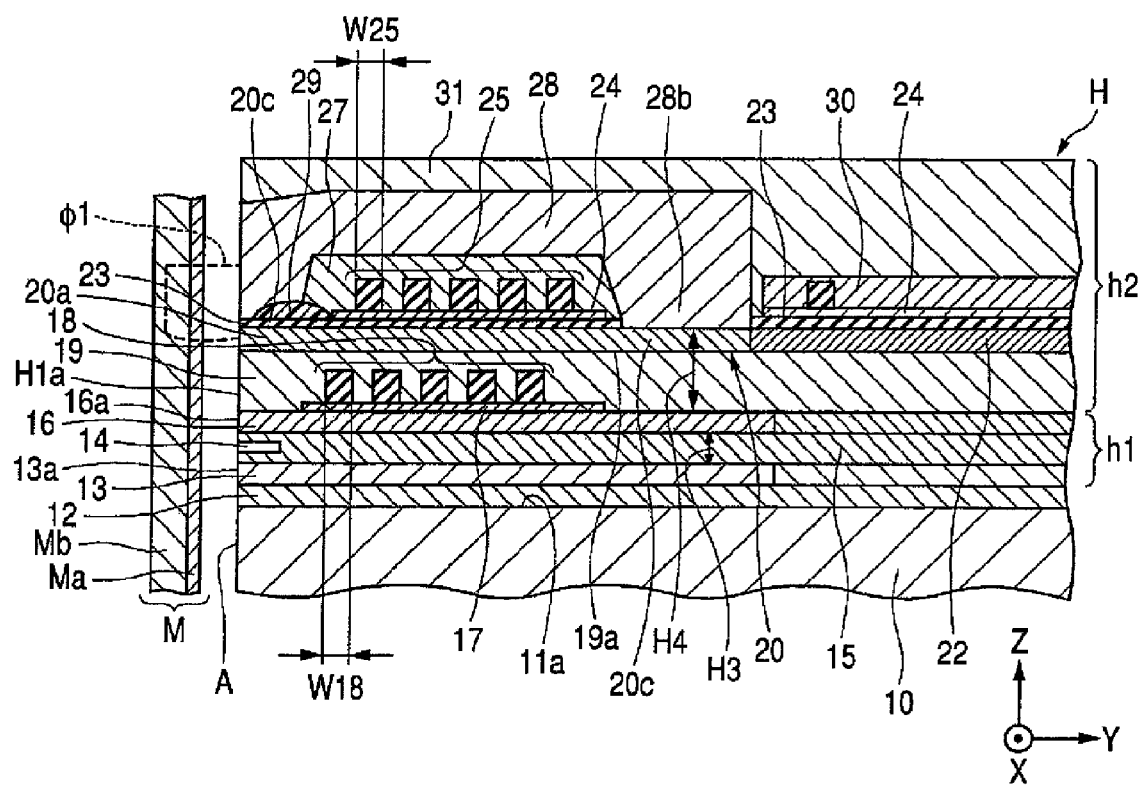
FIG. 2 is a perpendicular sectional view in which a thin-film magnetic head including a perpendicular magnetic recording head taken along the line I-I in FIG. 1 and is shown in an arrow direction.
Figure 3:
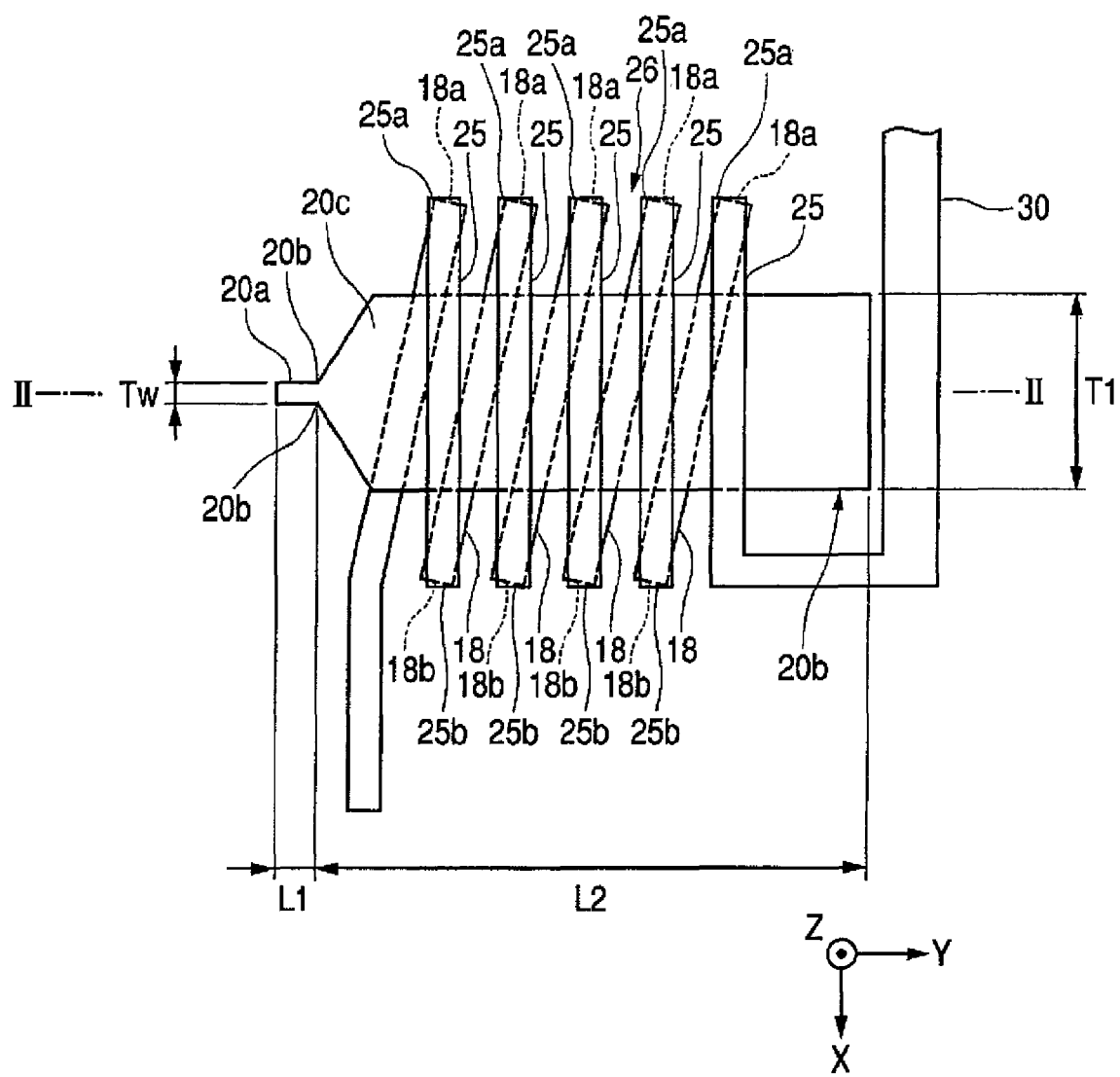
FIG. 3 is a fragmentary plan view of the perpendicular magnetic recording head shown in FIGS. 1 and 2.
Figure 4:
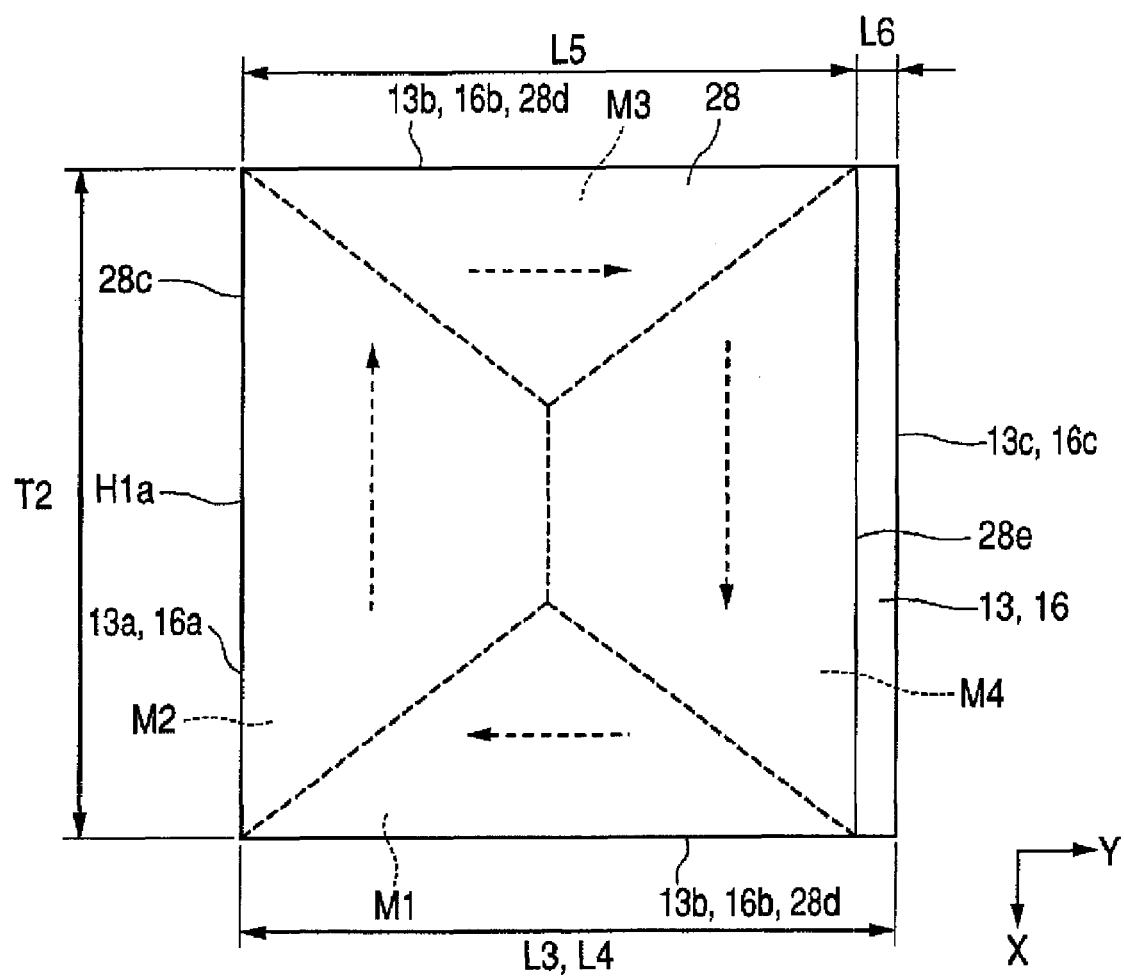
FIG. 4 is a plan view of a return-yoke layer, an upper shield layer, and a lower shield layer according to one embodiment.
Figure 5:
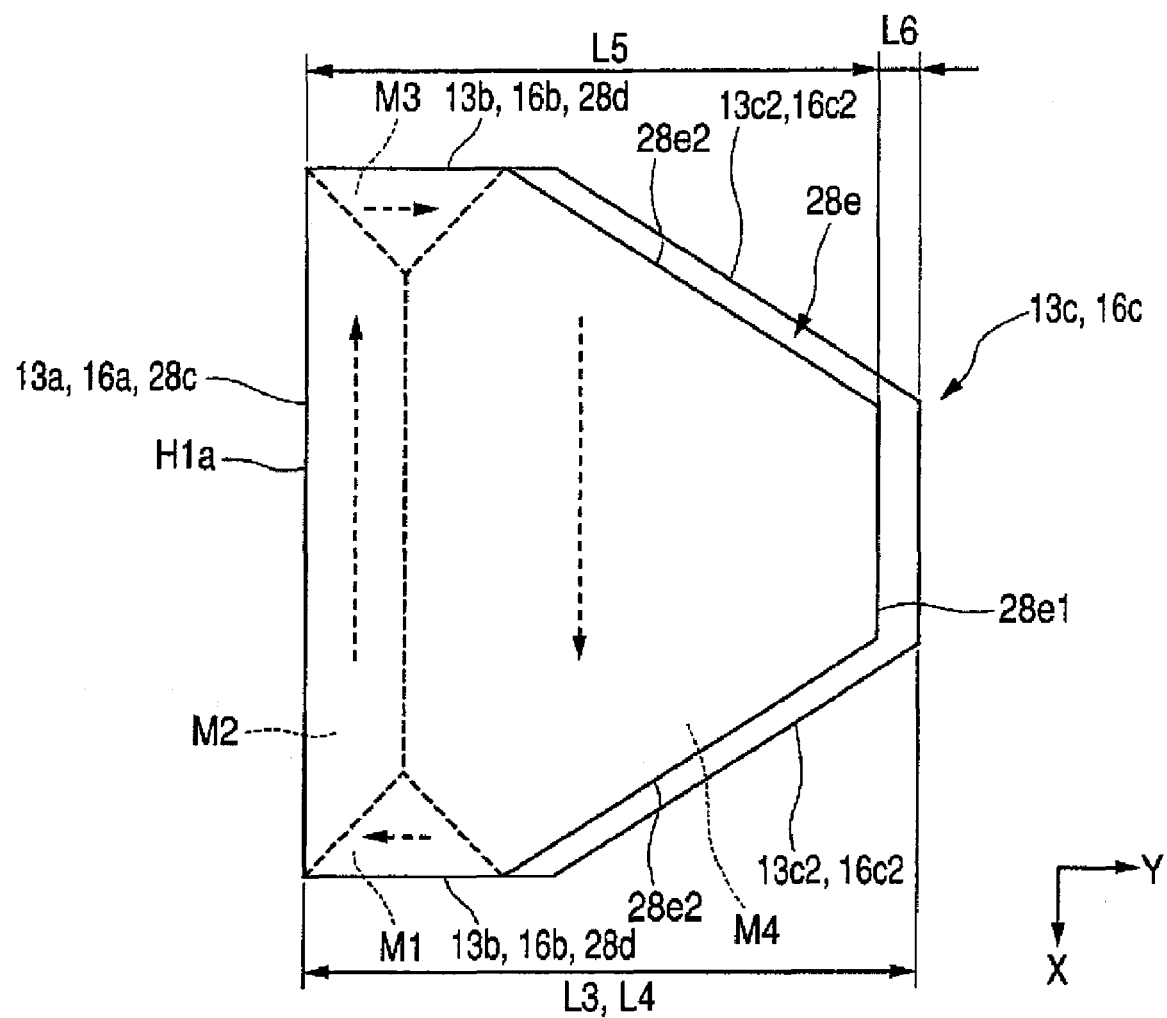
FIG. 5 is a plan view of a return-yoke layer, an upper shield layer, and a lower shield layer according to another embodiment.

FIG. 1 is a front elevation view of a perpendicular magnetic recording head according to one embodiment. FIG. 2 is a perpendicular sectional view in which a thin-film magnetic head including a perpendicular magnetic recording head taken along the line I-I in FIG. 1 along the line II-II in FIG. 3 in the directions of the film thickness and the length (Y direction in the drawing), and is shown in an arrow direction. FIG. 3 is a fragmentary plan view of a major magnetic pole layer and a coil layer of the perpendicular magnetic recording head shown in FIGS. 1 and 2. FIGS. 4 and 5 are a plan view of a return-yoke layer, an upper shield layer, and a lower shield layer according to the embodiment.

Generally, in the Figures, an X direction is a track-width direction, a Y direction is a length direction, and a Z direction is a direction of movement of a record medium M and lamination of each layer of the thin-film magnetic head H. Each direction is perpendicular to the two other directions.

According to one embodiment, the thin-film magnetic head H is formed on a trailing end surface 11a of a slider 11 constituting a rising head and is a record-reproducing complex type thin-film magnetic head (hereinafter, referred to as the thin-film magnetic head H) in which a reproduction head H1 and a write-record head H2 are laminated.

As shown in FIG. 2, the record head H2 constituting the thin-film magnetic head H is called a perpendicular record magnetic head which supplies a magnetic field for a record medium and perpendicularly magnetizes a hard film Ma of the record medium M, and the production head h1 detects a leakage field from the record medium M and decodes a record signal by using a magnetoresistance effect.

The record medium is in the shape of a disc, for example. On an upper surface, the record medium has the hard film Ma in which remnant magnetization is high, a soft film Mb in which a magnetic transmissivity is high, and rotates on the center of the disc.

The slider 11 is formed of a non-magnetic material such as $Al_2O_3$.Tic and the like. An opposed surface A of the slider 11 is opposite to the record medium M. When the record medium M rotates, the slier 11 levitates from the surface of the record medium M or slides to the record medium M.

A non-magnetic insulating layer 12 is formed of an inorganic material such as $Al_2O_3$, $SiO_2$, or the like on the trailing end surface 11a of the slider 11 and the reproduction head H1 is formed on the non-magnetic insulating layer 12.

The production Head H1 includes a lower shield layer 13, an upper shield layer 16, an inorganic insulating layer (a gap insulating layer) 15 therebetween, and a decoder 14 in the inorganic insulating layer. A front end surface 13a of the lower shield layer 13 and a front end surface 16a of the upper shield layer 16 are exposed to a opposed surface H1a (hereinafter, referred to as opposed surface H1a, and the opposed surface H1a is formed on the same line of the opposed surface A of the slider 11) opposite to the record medium as shown in FIGS. 2 and 4.

The front end surfaces 13a and 16a are formed parallel to the direction of the track width (the X direction in the drawing) as shown in FIG. 4. The decoder 14 is a magnetoresistance element such as an anisotropic magnetoresistance (AMR) element, a giant magnetoresistance (GMR) element, a tunnel magnetoresistance (TMR) and the like.

A plurality of a first coil layer is that is formed of a conductive material are formed on the upper shield layer 16 with a coil insulating foundation layer 17 interposed therebetween. The first coil layer 18 is formed of at least one metallic materials of, for example, Au, Ag, Pt, Cu, Cr, Al, Ti, NiP, Mo, Pd, Rh, and Ni. Further, the non-magnetic metallic materials may also be laminated.

A coil insulating layer 19 formed of an organic insulating material such as $Al_2O_3$ and the like is formed around the first coil layer 18.

An upper surface 19a of the coil insulating layer 19 is formed of a flattened surface and a major magnetic pole layer (a first magnetic layer) 20 is formed on the upper surface 19a. The major magnetic pole layer 20 is, for example, coated with a ferromagnetic material and is formed of a material with high saturation flux density.

As shown in FIG. 3, the major magnetic pole layer 20 has a fore-end portion 20a, which is formed of a slim and long shape of a predetermined length L1 in the direction of length (Y direction in the drawing), so as to be exposed to the opposed surface H1a in a track width Tw and a back-end portion (yoke portion) 20c, which extends from a base-end portion 20b of the fore-end portion 20a in the direction of length (Y direction in the drawing), so as to be widened more than the track width Tw.

The track width Tw is formed specifically in the range of about 0.1 to 1.0 μm and the length L1 is formed specifically in the range of about 0.1 to 1.0 μm.

In the back-end portion 20c, the largest length of a width size T1 is in the range about 1 to 100 μm in the direction of track width (X direction in the drawing) and a length size L2 of the back-end portion 20c is in the range of about 1 to 100 μm in the height direction.

As shown in FIGS. 1 and 2, an insulating material layer 22 is provided around the major magnetic pole layer 20. An upper surface 20d of the major magnetic pole layer 20 and an upper surface 22a of the insulating material layer 22 formed around the major magnetic pole layer 20 are formed of the same surface.

The insulating material layer 22 is formed of at least one, for example, among alumina ($Al_2O_3$), $SiO_2$, Al—Si—O, Ti, W, and Cr. As a non-magnetic layer, a gap layer 23 formed of an inorganic material such as alumina, $SiO_2$, and the like is provided on the major magnetic pole layer 20 and the insulating material layer 22.

As shown in FIG. 2, second coil layer 25 is formed on the gap layer 23 with the coil insulating foundation layer 24 interposed therebetween. The plurality of second coil layer 25 is formed of the conductive material as the same as the first coil layer 18. For example, the second coil layer 25 is formed of at least one or two or more metallic materials of, for example, Au, Ag, Pt, Cu, Cr, Al, Ti, NiP, Mo, Pd, Rh, and Ni. Further, such the non-magnetic metallic materials may also be laminated.

As shown in FIG. 3, in the first coil layer 18 and the second coil layer 25, end portions 18a and end portions 18b are electrically connected to end portions 25a and end portions 25b in the direction of the track width (X direction in the drawing), respectively. The first coil layer 18 and the second coil layer 25 are wound on the major magnetic pole layer 20 serving as an axis so as to form a solenoid coil layer 26.

As shown in FIG. 2, a size of a width w18 in the direction (X direction in the drawing) of the length of the first coil layer 18 is the same as that of a width w25 in the direction (Y direction in the drawing) of the length of the second coil layer 25.

A coil insulating layer 27 formed of an inorganic insulating material such as $Al_2O_3$ and the like is formed around the second coil layer 25. A gap-adjusting layer 29 formed of an organic or inorganic material is formed around the opposed surface H1a on the gap layer 23. The gap-adjusting layer 29 is formed at a predetermined distance from the opposed surface H1a. As a distance between the opposed surface H1a and the gap-adjusting layer 29, a throat length (gap depth) of the record head is regulated.

As shown in FIG. 2, a return-yoke layer formed of ferromagnetic materials such as a permalloy and the like is formed in an area that cover the coil insulating layer 27, the gap-adjusting layer 29, and the gap layer 23.

As shown in FIG. 1, a thickness H1 of a front end surface 20e of the major magnetic pole layer 20 is less than a thickness H2 of a front end surface 28a of the return-yoke layer 28. Further, a width size (track width Tw) in the direction of the track width (X direction in the drawing) of the front end surface 20e of the major magnetic layer 20 is sufficiently shorter than a width size T2.

As a result, an area of the front end surface 20e of the major magnetic pole layer 20 is sufficiently smaller than that of the front end surface 28a of the return-yoke layer 28. Accordingly, a magnetic flux φ1 of a leakage-recording magnetic field is concentrated on the front end surface 20e of the major magnetic pole layer 20. The hard film Ma is magnetized in a perpendicular direction by the concentrated magnetic flux φ1 so as to record magnetic data.

The front end surface 28a of the return-yoke layer 28 is exposed to the opposed surface H1a. The connecting portion 28b of the return-yoke layer 28 contacts the major magnetic pole layer 20 in an area more rear than the opposed surface H1a in the height direction. Additionally, the connecting portion 28b of the return-yoke layer 28 may not contact the major magnetic pole layer 20.

In the height direction (Y direction in the drawing) of the connecting portion 28b of the return-yoke layer 28, a lead layer 30 extended from the second coil layer 25 is formed on a coil insulating foundation layer 24. A protecting layer 31 formed of an inorganic non-magnetic insulating material covers the return-yoke layer 28 and the lead layer 30.

When the lead layer 30 supplies record current for the first coil layer 18 and the second coil layer 25 in the record head h2, a current magnetic field of the current flowing in the first coil layer 18 and the second coil layer 25 induces a record-magnetic field to the major magnetic pole layer 20 and the return-yoke layer 28. Additionally, in the opposed surface H1a, the magnetic flux φ1 of the record-magnetic field emits from the front end surface 20e of the major magnetic pole layer 20, passes through the hard film Ma of the record medium M and the soft film Mb, and returns to the front end surface 28a of the return-yoke layer 28.

The thin-film magnetic head of a perpendicular magnetic recording method has a configuration which inputs a recording signal by perpendicularly magnetizing a hard film of a record medium. Accordingly, the thin-film magnetic head of a perpendicular magnetic recording method may make narrower a required width to magnetize and transit so as to improve a recording density more than a thin-film magnetic head of a longitudinal magnetic recording method.

In one embodiment, as shown in a plane view in FIG. 4, a maximum length of L3 from a front end surface 13a in the height direction (Y direction in the drawing) is the same as that of L4 from a front end surface 16a of the upper shield layer 16. In the plane view in FIG. 4, a maximum length of the return-yoke layer 28 is L5 from the front end surface 28c in the height direction. The maximum length of L5 is shorter than that of L3 or L4 by length of L6 on the opposed surface H1a. The length of L6 is in the range of about 0 to 2 μm. The maximum lengths of L3 and L4 are in the range of about 3 to 120 μm and the maximum length of L5 is in the range of about 3 to 120 μm.

As shown in FIG. 2, a distance between an upper surface of the lower shield layer 13 and a lower surface of the upper shield layer 16 in the thickness direction (Z direction in the drawing) is H3. A distance between an upper surface of the upper shield layer 16 and a lower surface of the connecting 28b of the return-yoke 28 in the thickness direction (Z direction in the drawing) is H4. The distance of H4 is sufficiently larger than that of H3. In particular, the distance of H3 is in the range of about 20 to 200 nm and that of H4 is in the range of about 0.5 to 8 μm. For example, the distances of H3 and H4 are 0.05 μm and 4 μm, respectively.

A magnetostatic coupling working between the lower shield layer 13 and the upper shield layer 16 is stronger than that working between the upper shield layer 16 and the return-yoke layer 28. Accordingly, in the lower shield layer 13 and the upper shield layer 16, for example, the maximum lengths of L3 and L4 are rather different, and even when any one of the upper shield layer 16 and the lower shield layer 13 absorbs the floating magnetic field more, magnetization states of the upper shield layer 16 and the lower shield layer 13 are almost same.

Since the return-yoke layer 28 has been influenced weakly by the magnetostatic coupling as described above, the length of L6 may be adjusted such that a magnetization state at the time the floating magnetic field inflows into the thin-film magnetic head H can be similar to magnetization states of the lower shield layer 13 and the upper shield layer 16.

In one embodiment, when the length of L6 equals 0 μm, that is, the maximum length of L5 of the return-yoke layer 28, length of L3 of the lower shield layer 13, and the maximum length of L4 of the upper shield layer 16 are same, an intensity of the leakage magnetic field flowing out from the front end surface 28c of the return-yoke layer 28 is known to be larger than that of the leakage magnetic field flowing out from the upper shield layer 16 and the lower shield layers 13a and 16a. It is considered that since the magnetostatic coupling worked between the return-yoke layer 28 and the upper shield layer 16 is weak, the return-yoke layer 28 is in a state the floating magnetic field may be absorbed more easily than the upper shield layer 16 and the lower shield layer 13.

In one embodiment, the maximum length L5 of the return-yoke layer 28 is formed on the opposed surface H1a shorter than the maximum lengths L3 and L6 of the lower shield layer 13, but the length L6 may be adjusted in the range of 0 to 2 μm such that an intensity of a leakage magnetic field leaking from each of the front end surfaces 13a, 16a, and 28c of the lower shield layer 13 in the direction of the record medium may be balanced and low.

The maximum length L5 of the return-yoke layer 28 is formed on the opposed surface H1a shorter than the maximum length L3 and L4 of the upper shield layer 16 and the lower shield layer 13 by the length L6. The maximum lengths L3 and L4 of the upper shield layer 16 and the lower shield layer 13 is equal in the FIG. 4, but when the lengths L3 and L4 are different, the length L6 is adjusted to the longer length of the lengths L3 and L4.

Even when the maximum lengths L3 and L4 are different, a magnetostatic coupling strongly works between the upper shield layer 16 and the lower shield layer 13 and a magnetization state of the upper shield 16 and the lower shield layer 13 is almost equal. The shield layer extending in the height direction absorbs the floating magnetic field itself. Accordingly, in order to adjust an intensity of the floating magnetic field absorbed in the shield layers and an intensity of floating magnetic field absorbed in the return-yoke layer 28, the maximum length L5 of the return-yoke layer 28 is adjusted to the shield layer extending in the height direction, as described above.

It is preferable that the length L6 equals about 2 µm. According to an experiment result which is described below, it is possible to lower the intensity of the leakage magnetic field leaking from the front end surfaces 13a, 16a, and 28c of the return-yoke layer 28, the upper shield layer 16, and the lower shield layer 13 so as to be almost equal.

In one embodiment, the perpendicular magnetic recording head H2 may properly prevent record data recorded in the record medium M from being erased due to the leakage magnetic field.

In one embodiment, the maximum length L4 of the upper shield layer 16 and the maximum length L3 of the lower shield layer are preferably in the range about 0.9 to 1.1 µm, and more preferably about 1 µm. It is more preferable that the maximum lengths L3 and L4 are equal. The magnetostatic coupling strongly works between the lower shield layer 13 and the upper shield layer 16 as described above.

When the lengths L3 and L4 are drastically different, the magnetostatic coupling becomes weak, another magnetization state occurs, and the original shape is changed, and therefore, it is difficult to be magnetized. Accordingly, the intensity of the leakage magnetic field leaking from the front end surfaces 13a and 16a of the upper shield layer 16 and the lower shield layer 13 may be easily changed. In one embodiment, in order to deal with the problem, the maximum lengths L3 and L4 are set in the range of about 0.9 to 1.1 µm such that the intensity of the leakage magnetic field leaking from the front end surface 13a of the lower shield layer 13 almost equals that of the leakage magnetic field leaking from the front end surface 16a of the upper shield layer 16.

The maximum length (L1+L2 shown in the FIG. 3) in the height direction of the major magnetic pole layer 20 is preferably the same as that of the return-yoke layer 28 or shorter than the maximum L5 of the return-yoke layer 28. Since the major magnetic pole layer 20 connects the return-yoke layer 28 and the connecting portion 28b, a length to connect to the connecting portion 28b is required.

A front end portion 20a of the major magnetic pole layer 20 is exposed to the opposed surface H1a as much as the track width Tw and the front end portion 20a is very thin. It is difficult for a magnetic domain to be formed in the front end portion 20a and even when the magnetic domain is formed, it is very small. Accordingly, the intensity of the leakage magnetic field from the front end portion 20a may be lower than that of the return-yoke layer 28, but when the major magnetic pole layer 20 extends longer than the return-yoke layer 28, the major magnetic pole layer 20 may easily absorb the leakage magnetic field. Additionally, since the leakage magnetic field flowing out from the major magnetic pole layer 20 and the return-yoke layer 28 may be easily increased, it is preferable that a length of the major magnetic pole layer 20 is regulated as described above.

In one embodiment, as shown in FIG. 4, the lower shield layer 13 the upper shield layer 16, and the return-yoke layer 28 connect the front end surfaces 13a, 16a, 28c exposed to the opposed surface H1a and both edges in the direction of the track width (X direction in the drawing) of the front end surfaces 13a, 16a, and 28c; connect side sectional surfaces 13b, 16b, and 28d; and connect a distance between the side sectional surfaces 13b, a distance between the side sectional surfaces 16b, and a distance between the side sectional surfaces 28d in the back of the height direction so as to form back end surfaces 13c, 16b, 28e extending in a direction parallel to the direction of track width (X direction in the drawing).

As shown in FIG. 4, the lower shield layer 13, the upper shield layer 16, and the return-yoke layer 28 all are formed of a rectangular shape. In FIG. 4, each of the magnetic layers has the maximum lengths L3, L4, and L5 in any location in the direction of the track width. As shown in FIG. 4, the lower shield layer 13 and the upper shield layer 16 are formed of the same plane shape. In the return-yoke layer 28, the maximum length L5 is shorter than the lower shield layer 13 and the upper shield layer 16 by the length L6, and the back end surface 28c of the return-yoke layer 28 extends in a direction parallel to the direction of the track width (X direction in the drawing) so as to be equal to the back end surfaces 13c and 16c of the upper shield layer 16 and the lower shield layer 13, and formed so as to be equal to a width T2.

In one embodiment, each of the back end surfaces 13c, 16c, and 28e is formed of the same shape. The whole back end surface 28e of the return-yoke layer 28 is formed longer than the back end surfaces 13c and 16c of the upper shield layer 16 and the lower shield layer 13 by the length L6 on the opposed surface H1a. Accordingly, the intensity of the leakage magnetic field leaking from the each of the front end surfaces 13a, 16a, and 28c of the return-yoke layer 28, the upper shield layer 16, and the lower shield layer 13 may be more effectively balanced and reduced.

In one embodiment, when the return-yoke layer 28, the upper shield layer 16, and the lower shield layer 13 are approximately rectangular, it is supposed that a multi-magnetic domain structure is magnetized (the magnetic domain refers to dot lines). A dotted arrow shown in FIG. 4 refers to a direction of spontaneous magnetization in each of the magnetic domains. When each of the magnetic layers absorbs a floating magnetic field, the leakage magnetic field easily flows out toward a direction of the record medium M from corners in the direction of the track width of the front end surfaces 13a, 16a, and 28c in which there is a magnetic domain M1 perpendicular to the record medium.

Accordingly, the return-yoke layer 28, the upper shield layer 16, and the lower shield layer 13 are preferably formed such that the magnetic domains M1 and M3 in a direction parallel to the height direction become small. The aspect ratio is adjusted such that the maximum length T2 in the direction of the track width can become longer than the maximum lengths L3, L4, and L5.

In one embodiment, the return-yoke layer 28, the upper shield layer 16, and the lower shield layer 13 become elongated in the direction of the track width, and thus it is easy for magnetic domains M2 and M4 in the direction of the track width to become large.

In one embodiment, as shown in FIG. 5, each of back end surfaces 13c, 16c, and 28e of the return-yoke layer 28, the upper shield layer 16, and the lower shield layer 13 can be formed. Each of the back end surfaces 13c, 16c, and 28e constitute the last end surfaces 13c1, 16c1, and 28c1 which are formed in locations separated from the opposed surface H1a and toward a direction parallel to the track width (X direction in the drawing) and tilted surfaces 13c2, 16c2, and 28e2 which are located between the last end surfaces 13c1, 16c1, and 28e1 and upper end surfaces 13b, 16b, and 28d and in which a width with respect to the direction of track width (X direction in the drawing) becomes smaller toward the height direction (Y direction in the drawing) from the most back portions of the upper surfaces 13b, 16b, and 28d. As shown in FIG. 5, magnetic domains M1 and M3 going toward a direction parallel to the height direction may be smaller than those in FIG. 4, thereby lowering a magnitude of the leakage magnetic field leaking from the each of the front end surfaces 13a, 16a, and 28c.

In one embodiment, as shown in FIG. 5, which is similar to FIG. 4, a shape of an upper shield layer 16 is the same as that of a lower shield layer 13, and a shape of a back end surface 28e of the return-yoke layer 28 is the same except the back end surface 28e is longer than the back end surfaces 13c and 16c of the upper shield layer 16 and the upper lower shield layer 13 by a length L6. The shape of the back end surface 28c of the return-yoke layer 28 is the same as that of the back end surfaces 13c and 16c of the upper shield layer 16 and the lower shield layer 13. The shape of the back end surface 28c of the return-yoke layer 28 is similar to that of the back end surfaces 13c and 16c of the upper shield layer 16 and the lower shield layer 13. When the shape is similar, the length L6 in all areas between the back end surface 28c, and the back end surfaces 13c and 16c of the upper shield layer 16 and the lower shield layer 13 cannot be uniform except for simple shapes such as a straight line and the like. Accordingly, when the length L6 in the all areas, for example equals 2 µm, the most preferable length, it is preferable that shapes of the back end surfaces 13c, 16c, and 28e are equal.

In the perpendicular magnetic recording head h2 shown in FIGS. 1 and 2, a length of the major magnetic pole layer 20 is almost the same as that of the return-yoke layer 28 in the height direction (Y direction in the drawing) and the major magnetic pole layer 20 and the return-yoke layer 28 are connected in the back of the height direction. For example, the major magnetic pole layer 20 is formed shortly, and a supplementary yoke layer (not shown) connecting the major magnetic pole layer 20 to the return-yoke layer 28 may be provided. In this case, "a first magnetic layer" is formed of the major magnetic polo layer 20 and the supplementary yoke layer.

In the perpendicular magnetic recording head h2 shown in FIGS. 1 and 2, the major magnetic pole layer 20 is provided below the return-yoke layer 28, but the return-yoke layer 28 includes the above-embodiment even when the major magnetic pole layer 20 is provided below the return-yoke layer 28.

EXAMPLE

A lower shield layer and an upper shield layer were arranged at the interval of 0.1 µm and the upper shield and a return-yoke layer were arranged in the interval of 4 µm. After applying a floating magnetic field of 100 Oe or so, an experiment of measuring a magnitude of a leakage magnetic field leaking from front surfaces of the lower shield layer, the upper shield layer, and the return-yoke layer was carried out.

The lower shield layer, the upper shield layer, and the return-yoke layer employed in the experiment were rectangular like the rectangular shape shown in FIG. 4 (a shape of the return-yoke layer was not a three-dimensional view shown in FIG. 2 but a plane view as the same as the lower shield layer and the upper shield layer). Each width of the lower shield layer, the upper shield layer, and the return-yoke layer in the direction of the track width was 60 µm, each film thickness of the lower shield layer and the upper shield layer was 1.2 µm and a film thickness of the return-yoke layer was 1.6 µm.

First, each length of the upper shield layer and the return-yoke layer of the height direction was fixed to 22 µm. When a length of the lower shield layer was changed in the height direction, a relationship between the length of the lower shield and a magnetic field intensity of a leakage magnetic fields leaked from the each of front end surfaces of the return-yoke layer, the upper shield layer, and the lower shield layer was examined. The result of the experiment is shown in FIG. 6.

Figure 6:
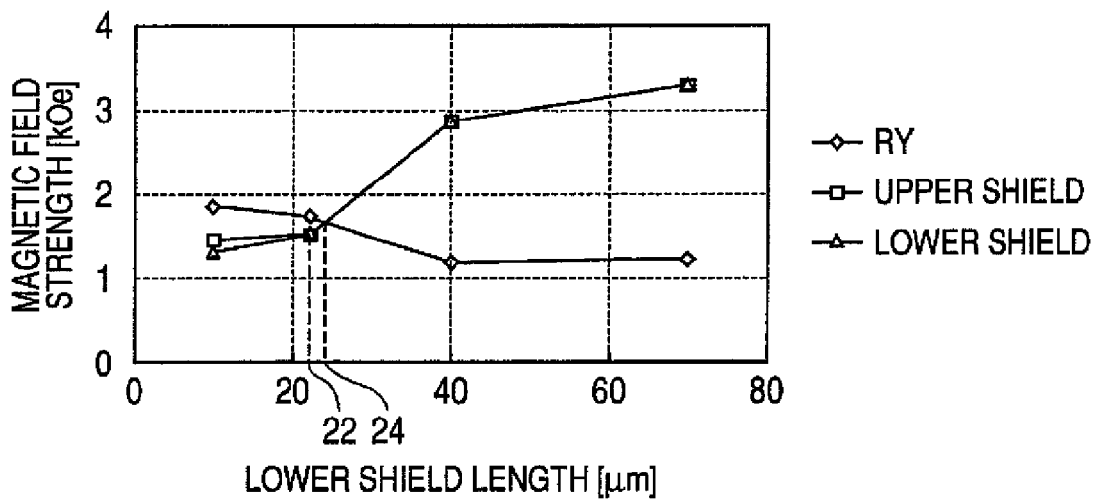
FIG. 6 is a graph showing a relationship of a length of a lower shield layer and a magnitude of a leakage magnetic field diffused from a return-yoke layer, an upper shield layer, and the lower shield (where length of the return-yoke and the upper shield layer are all 22 µm).

As shown in FIG. 6, when the length of the lower shield became longer, the magnitude of the leakage magnetic fields diffused from the return-yoke layer was inclined to decrease, but in contrast, the magnitudes of the leakage magnetic fields diffused from the upper shield layer and the lower shield layer were inclined to increase. The magnitudes of the leakage magnetic fields diffused from the upper shield layer and the lower shield layer were almost the same. As shown in FIG. 6, when the length of the lower shield layer was almost 24 µm, the magnitudes of the leakage magnetic fields diffused from the return-yoke layer, the upper shield layer, and the lower shield layer were almost the same. In this case, since the length of the lower shield layer and the return-yoke layer were 24 µm and 22 µm, respectively, the length of the return-yoke layer was shorter than that of the lower shield layer by 2 µm.

Figure 7:
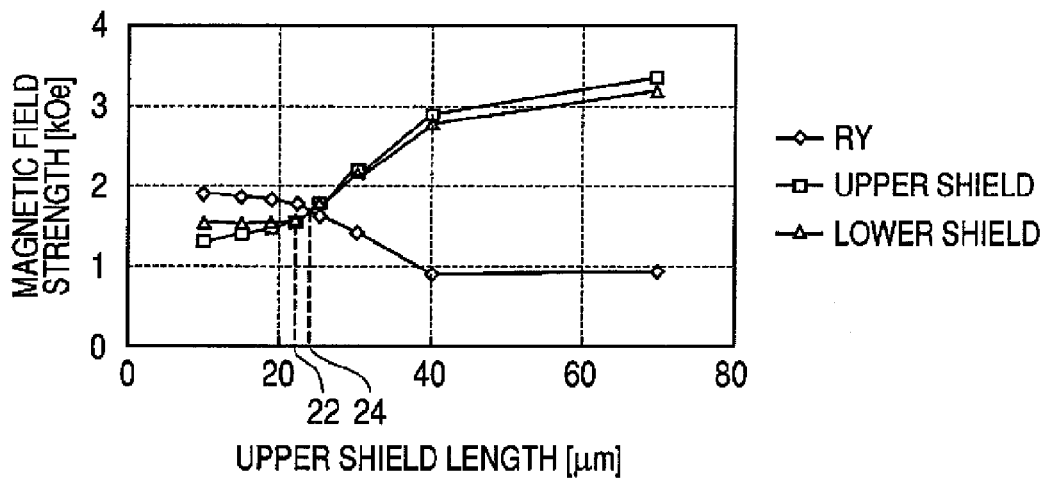
FIG. 7 is a graph showing a relationship of a length of an upper shield layer and a magnitude of a leakage magnetic field diffused from a return-yoke layer, the upper shield layer, and a lower shield layer (where length of the return-yoke layer and the lower shield layer are all 22 µm).

In the next experiment, when the lengths of the height direction of the lower shield layer and the return-yoke layer were all fixed to 22 µm, and the length of the upper shield was changed in the height direction, a relationship of the length of the upper shield layer and the magnetic magnitudes of the leakage magnetic fields diffused from each end surface of the return-yoke layer, the upper shield layer, and the lower shield layer was examined. The result is shown in FIG. 7.

When the length of the upper shield layer became longer, the magnitude of the leakage magnetic field diffused from the return-yoke layer was inclined to decrease, and the magnitudes of the leakage magnetic fields diffused from the upper shield layer and the lower shield layer were inclined to increase.

The magnitudes of the leakage magnetic fields diffused from the upper shield layer and the lower shield layer were almost the same. In the FIG. 7, when the length of the upper shield layer was almost 24 µm, the magnitudes of the leakage magnetic fields leaked from the return-yoke layer, the upper shield layer, and the lower shield layer were almost the same. In this case, since the length of the upper shield layer and the return-yoke layer were 24 µm and 22 µm, respectively, the return-yoke layer was formed on the opposed surface to have shorter length than the upper shield layer by 2 µm.

In the next experiment, when the lengths of the height direction of the lower shield layer and the upper shield layer were all fixed to 22 µm, and the length of the return-yoke was changed in the height direction, a relationship of the length of the return-yoke and the magnetic magnitude of the leakage magnetic field diffused from each end surface of the return-yoke layer, the upper shield layer, and the lower shield was examined. The experiment result is shown in FIG. 8.

Figure 8:
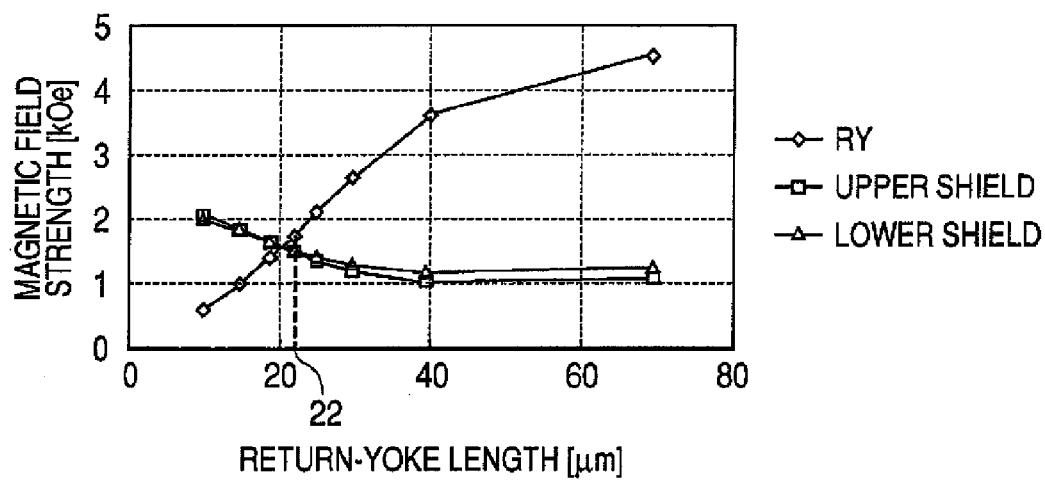
FIG. 8 is a graph showing a relationship of a length of a return-yoke shield layer and a magnitude of a leakage magnetic field diffused from the return-yoke layer, the upper shield layer, and a lower shield layer (where length of the upper shield layer and the lower shield layer are all 22 µm).

In FIG. 8, when the length of the return-yoke became longer, the magnitude of the leakage magnetic field diffused from the return-yoke layer was inclined to increase, but the magnitudes of the leakage magnetic fields diffused from the upper shield layer and the lower shield layer were inclined to decrease. The magnitudes of the leakage magnetic fields diffused from the upper shield layer and the lower shield layer were almost the same. In FIG. 8, when the length of the return-yoke layer was almost 20 µm, the magnitude of the leakage magnetic layer diffused from the return-yoke layer, the upper shield layer, and the lower shield layer were almost the same. Since the lengths of the lower shield layer and the upper shield layer were 20 µm and the length of the return-yoke layer was 20 µm, the return-yoke layer was formed on the opposed surface to have shorter length than the lower shield layer and the upper shield layer by 2 µm.

In the next experiment, when the lengths of the height direction of the lower shield layer and the upper shield layer were all fixed to 40 (m, and the length of the height direction of the return-yoke layer was changed, a relationship of the length of the return-yoke and the magnetic magnitudes of the leakage magnetic field leaked from each front end surface of the return-yoke layer, the upper shield layer, and the lower shield was examined. The experiment result was shown in FIG. 9.

Figure 9:
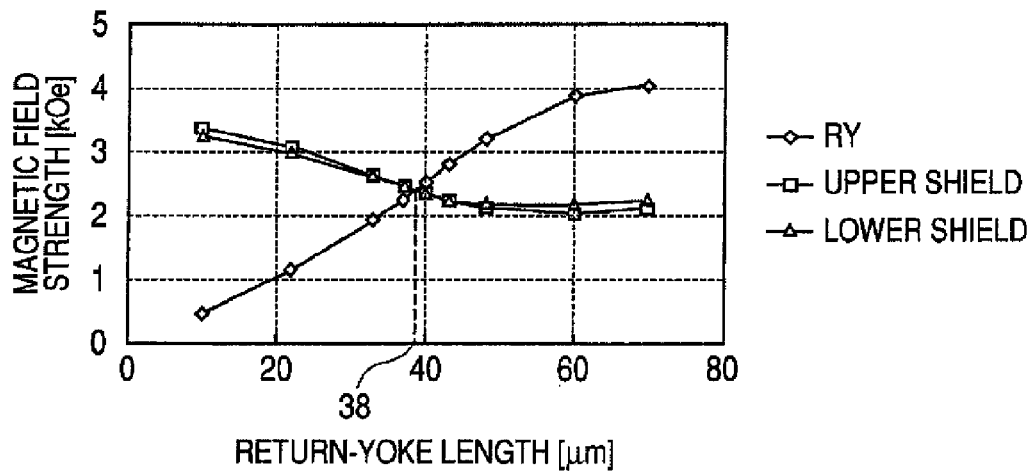
FIG. 9 is a graph showing a relationship of a length of a return-yoke shield layer and a magnitude of a leakage magnetic field diffused from a return-yoke layer, the upper shield layer, and a lower shield layer (where length of the upper shield layer and the lower shield layer are all 40 µm).

In the FIG. 9, when the length of the return-yoke became longer, the magnitude of the leakage magnetic field diffused from the return-yoke layer was inclined to increase, and the magnitudes of the leakage magnetic fields diffused from the upper shield layer and the lower shield layer were inclined to decrease. Further, the magnitudes of the leakage magnetic fields diffused from the upper shield layer and the lower shield layer were almost the same. In this case, when the length of the return-yoke layer was 38 (m, the magnetic magnitudes leaked from the return-yoke layer, the upper shield layer, and the upper shield layer were almost the same. Additionally, since the length of the lower shield layer and the upper shield layer were 40 (m, and the length of the return-yoke layer is 38 (m, the length difference was 2 (m.

In the experiment results of FIGS. 6 to 9, the magnitude of the leakage magnetic field diffused from each front end surface of the return-yoke layer, the upper shield layer, and the lower shield layer was more balanced and reduced, when the length of the height direction of the return-yoke layer was shorter than the longer length of lengths of the upper shield layer and the lower shield layer by 0 to 2 (m, rather than when the lengths of the return-yoke layer, the upper shield layer, and the lower shield layer were equal.

In particular, the length of the height direction of the return-yoke layer was shorter than the lengths of the height direction of the upper shield layer and the lower shield layer by 2 (m, the magnitude of the leakage magnetic field diffused from each front end of the return-yoke layer, the upper shield layer, and the lower shield layer preferably became smaller so as to be equal.

When the return-yoke layer was formed shorter in the range of 0 to 2 μm (exclusive of 0 μm) than the longer length of the lengths of the upper shield layer and the lower shield layer, and even more preferably by 2 μm, the magnitudes of the leakage magnetic fields diffused from each front end were balanced and reduced. In FIGS. 8 and 9, when lengths of the direction of the return-yoke layer, the upper shield layer, and the lower shield layer were changed, the limitation of the lengths was proved to have generality.

Even when the lengths of the height direction of the lower shield layer and the upper shield layer were different in the FIGS. 6 and 7, the magnitudes of the leakage magnetic fields diffused from each front end surface of the lower shield layer and the upper shield layer were almost the same. However, the lengths of the height direction of the lower shield layer and the upper shield layer were equal, the magnitudes of the leakage magnetic field diffused from each front end surface of the lower shield and the upper shield layer were almost the same in FIGS. 8 and 9. Additionally, on the basis of the experiment results shown in FIGS. 6 and 7, the lengths of the height direction of the upper shield layers and the lower shield layer are in the range of 0.9 to 1.1 μm.

Figure 10:
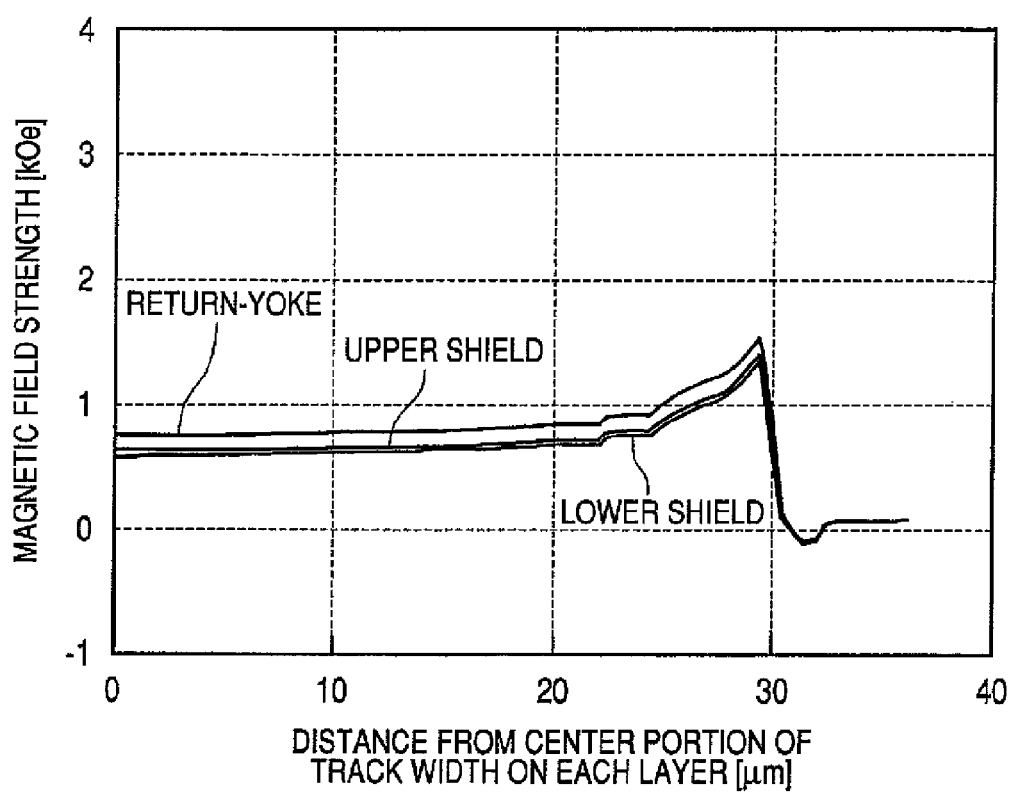
FIG. 10 is a graph showing a relationship of the magnitude of the leakage magnetic field diffused from the return-yoke layer, the upper shield layer, and the lower shield layer and the length from the center of the track width direction.

FIG. 10 is a graph showing a relationship of the magnitude of the leakage magnetic field diffused from the return-yoke layer, the upper shield layer, and the lower shield layer and the length from the center of the track width direction. A longitudinal axis shows the magnitude of the magnetic field and a horizontal axis shows the length from the center of the track width direction of each layer. Additionally, in the experiment, the return-yoke layer, the upper shield layer, and the lower shield layer were employed, and the lengths of the return-yoke layer, the upper shield layer, and the lower shield layer were all 22 μm (where other conditions were equal to those of the above experiment).

As shown in FIG. 10, the magnitudes of the leakage magnetic fields diffused from each front end of the return-yoke, the upper shield layer, and the lower shield layer were maximum near 30 μm. Since the width of the track width direction of the front end surface was 60 μm, the magnitude near 30 μm exactly corresponded to the corner portions of the front end surface and side end surface, and the strong leakage magnetic fields were diffused from near the corner portions. As described in FIGS. 4 and 5, this was because the magnetic domain going toward the direction parallel to the height direction was formed near the corner portions. In the experiment, the rectangular shaped magnetic layer represented in FIG. 4 was employed. In order to lower the magnitudes of the leakage magnetic fields diffused from both side of the track width direction of the front end surface, it is preferable that, for example, the magnetic domain going toward the direction parallel the height direction shown in FIG. 5 became small.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A thin-film magnetic head comprising: a perpendicular magnetic recording head formed on a reproducing head so as to overlap therewith,
wherein the reproducing head comprises an upper shield layer, a lower shield layer, the upper shield layer and the lower shield layer opposed to each other in a thickness direction thereof, and a reproducing element formed between the upper shield layer and the lower shield layer,
wherein the magnetic recording head has a first magnetic layer including a major magnetic pole exposed at a facing surface facing a recording medium by a track width TW, a return-yoke layer opposite to the first magnetic layer with a gap layer interposed therebetween at the facing surface, and a coil layer provided between the first magnetic layer and the return-yoke layer and generating a recording magnetic field,
wherein a distance gap in the thickness direction between the return-yoke layer and the upper shield layer is longer than that a distance in the thickness direction between the upper shield layer and the lower shield layer,
wherein a back end surface of the return-yoke layer has inclined surfaces in which a width between the inclined surfaces in a track direction becomes gradually larger toward the facing surface,
wherein the upper shield layer and the lower shield layer each have a back end surface,
wherein the back end surfaces of the return-yoke layer, the upper shield layer, and the lower shield layer are similar in shape,
wherein a distance in a height direction from the facing surface to the back end surface of the return-yoke layer is smaller by a predetermined length than the longer of a distance in the height direction from the facing surface to the back end surface of the upper shield layer and a distance in the height direction from the facing surface to the back end surface of the lower shield layer.

2. The thin-film magnetic head according to claim 1, wherein the length of the return-yoke layer is shorter than the length of the upper shield layer and the lower shield layer.

3. The thin-film magnetic head according to claim 1, wherein the predetermined length is less than or equal to 2 μm.

4. The thin-film magnetic head according to claim 1, wherein the predetermined length is 2 μm.

5. The thin-film magnetic head according to claim 1, wherein a ratio of the length of the upper shield layer to the length of the lower shield layer is in the range of about 0.9 to 1.1.

6. The thin-film magnetic head according to claim 5, wherein the length of the upper shield layer is equal to the length of the lower shield layer.

7. The thin-film magnetic head according to claim 1, wherein each of the return-yoke layer, the upper shield layer, and the lower shield layer further comprises an upper surface, a lower surface, a front end surface, a first side surface, and a second side surface;
- wherein the back end surfaces of the upper shield layer and the lower shield layer both have inclined surfaces;
- wherein for each of the return-yoke layer, the upper shield layer, and the lower shield layer, the inclined surfaces comprise a first inclined surface and a second inclined surface, and the back end surface further comprises a rear surface;
- wherein for each of the return-yoke layer, the upper shield layer, and the lower shield layer, the first side surface abuts the first inclined surface at a first corner, the second side surface abuts the second inclined surface at a second corner, the first inclined surface abuts the rear surface at a third corner, and the second inclined surface abuts the rear surface at a fourth corner;
- wherein for each of the return-yoke layer, the upper shield layer, and the lower shield layer, a length comprises a distance extending from the front end surface to the rear surface, a first width comprises a distance extending from the first corner to the second corner, and a second width comprises a distance extending from the third corner to the fourth corner;
- wherein for each of the return-yoke layer, the upper shield layer, and the lower shield layer, the first width is greater than the second width; and
- wherein the length of the return-yoke layer is less than a larger one of the length of the upper shield layer and the length of the lower shield layer by the predetermined length.

* * * * *

UNITED STATES PATENT AND TRADEMARK OFFICE
CERTIFICATE OF CORRECTION

PATENT NO. : 7,821,745 B2
APPLICATION NO. : 11/676709
DATED : October 26, 2010
INVENTOR(S) : Hiroshi Kameda et al.

It is certified that error appears in the above-identified patent and that said Letters Patent is hereby corrected as shown below:

In the Claims

In column 14, claim 1, line 50, before "a distance in the thickness" delete "that".

Signed and Sealed this
Eleventh Day of January, 2011

David J. Kappos
*Director of the United States Patent and Trademark Office*